United States Patent [19]

Hoefer et al.

[11] Patent Number: 4,787,956
[45] Date of Patent: Nov. 29, 1988

[54] FRICTION WELDING APPARATUS

[75] Inventors: John A. Hoefer; David S. Perry; Edward J. Schelmbauer, all of Louisville, Ky.

[73] Assignee: General Electric Company, Louisville, Ky.

[21] Appl. No.: 145,130

[22] Filed: Jan. 19, 1988

[51] Int. Cl.$^4$ .............................................. B29C 65/06
[52] U.S. Cl. .................................. 156/497; 156/73.5; 156/580
[58] Field of Search ................ 156/73.5, 580, 69, 294, 156/423, 497; 264/68; 228/2

[56] References Cited

U.S. PATENT DOCUMENTS

| | | | |
|---|---|---|---|
| 3,316,135 | 4/1967 | Brown et al. | 156/580 |
| 3,484,093 | 12/1969 | Mermelstein | 269/21 |
| 3,759,770 | 9/1973 | Brown et al. | 156/73.5 |
| 3,993,519 | 11/1976 | Birkhold | 156/73.5 |
| 4,075,820 | 2/1978 | Standley | 53/329 |
| 4,253,713 | 3/1981 | Chambers, Sr. | 384/481 |
| 4,411,726 | 10/1983 | Woerz et al. | 156/423 |
| 4,466,844 | 8/1984 | MacLaughlin et al. | 156/69 |
| 4,469,547 | 9/1984 | Mitchell et al. | 156/423 |
| 4,477,307 | 10/1984 | Cearlock et al. | 156/580 |
| 4,584,037 | 4/1986 | Fortuna et al. | 156/73.5 |
| 4,721,546 | 1/1988 | Clark et al. | 156/73.5 |

Primary Examiner—Michael Wityshyn
Attorney, Agent, or Firm—Frederick P. Weidner; Radford M. Reams

[57] ABSTRACT

Apparatus for holding and spinning a plastic part during a friction welding operation to join the plastic part to work piece. There is included in the apparatus a driver to impact rotational movement, a vacuum chamber, and a rotatable part driver assembly. The part driver assembly is connected to the driver for rotational movement and has air ports in air flow communication with the vacuum chamber. The part driver assembly rotates the plastic part to be friction welded to a work piece. The part driver assembly also includes a vacuum head member with a hollow body rotatable independent of the part driver assembly, one end of the vacuum head member being adapted to receive a plastic part for friction welding to a work piece and the other end of the vacuum head being in air flow communication with the air ports in the part driver assembly to hold the plastic part on the vacuum head member by vacuum pressure during the friction welding operation.

9 Claims, 2 Drawing Sheets

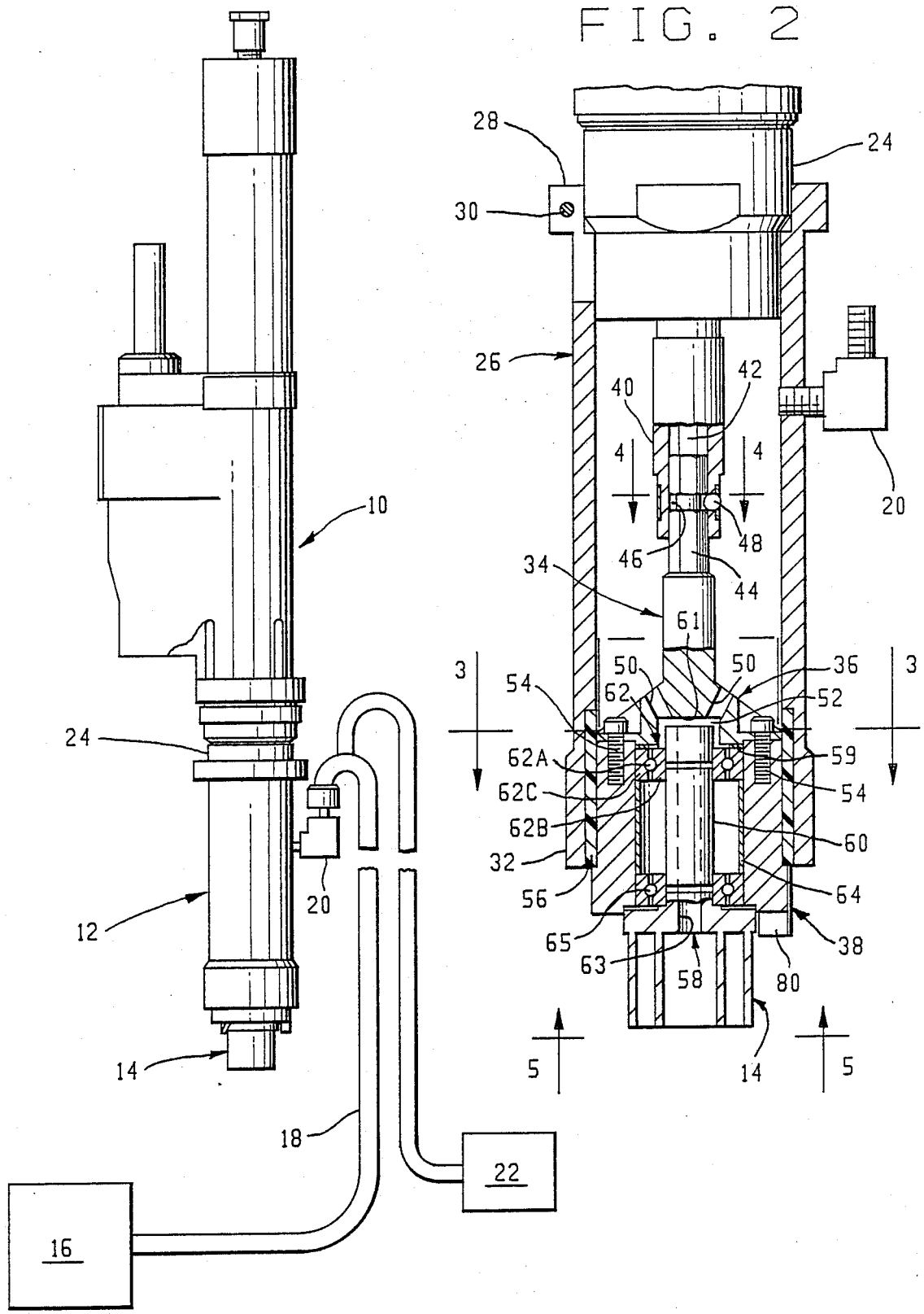

FRICTION WELDING APPARATUS

BACKGROUND OF THE INVENTION

This invention relates to apparatus for friction or spin welding thermal plastic parts to a thermal plastic work piece.

Various techniques have been used to fuse thermal plastic fasteners or parts and work pieces together. The techniques generally involve frictionally heating the interface between the plastic part and the work piece by applying contact pressure while at the same time rotating the members relative to one another. When the interface of the two members has achieved molten state, the rotation is stopped while the contact pressure is maintained for a time sufficient to allow the interface to solidify. The length of time required to achieve a molten interface depends upon a variety of factors including plastic part material, work piece material, the size and configuration of the interface, the amount of contact pressure, the speed of rotation, the thermal dissipation characteristics of the connection, the dynamic friction characteristics of the interface, and other factors. After the molten state at the interface is achieved, it is necessary to continue to apply contact pressure until the interface returns to the solid state and the time required in this step varies with the materials involved.

A friction welded fastener system wherein a fastener or plastic part is friction welded to a work piece is disclosed in U.S. Pat. No. 4,477,307. In the type of friction welding apparatus disclosed in that patent a standard pneumatic tool or driver is equipped with a nose piece and driver assembly to hold the plastic part in place during the friction welding operation. The plastic part is held in place by a "press fit" between the plastic part body and the driver assembly. It is necessary that an operator manually load the plastic part onto the driver assembly and then initiate the friction welding operation. Such apparatus cannot apply fasteners or plastic parts to a work piece automatically. Ideally, a friction welding operation should be automated to reduce labor costs and improve production efficiency. To do so it is necessary to orient and feed the plastic parts to the friction welding apparatus, have the plastic parts picked up positively by the friction welding apparatus, sense the presence or absence of the plastic part on the friction welding apparatus, and if the plastic part is present, proceed with the friction welding operation to join the plastic part to the work piece.

By the present invention friction welding apparatus is provided that will automatically place the plastic part on the apparatus, sense whether or not a plastic part is actually present on the apparatus and the plastic part is gripped through the use of vacuum pressure to be maintained on the apparatus during the friction welding operation.

SUMMARY OF THE INVENTION

Apparatus for holding and spinning a plastic part during a friction welding operation to join the plastic part to a work piece is provided. The apparatus includes a driver to impart rotational movement, a vacuum chamber, and a rotatable part driver assembly. The part driver assembly is connected to the driver for rotational movement and has air ports in air flow communication with the vacuum chamber. The part driver assembly has means to rotate the plastic part in unison therewith.

The part driver assembly also includes a vacuum head member with a hollow body rotatable independent of the part driver member, one end of the vacuum head member being adapted to receive a plastic part for friction welding to a plastic work piece and the other end of the vacuum head member is in air flow communication with the air ports in the part driver assembly. The plastic part is held on the vacuum head member by vacuum pressure during the friction welding operation.

BRIEF DESCRIPTION OF THE DRAWINGS

FIG. 1 is a side elevational view of friction welding apparatus incorporating the present invention.

FIG. 2 is a cross-sectional view of a portion of the friction welding apparatus shown in FIG. 1 and incorporating the present invention.

DESCRIPTION OF THE PREFERRED EMBODIMENT

Figure 5:
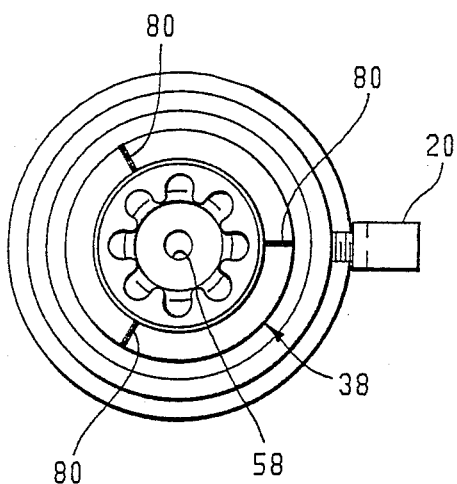
FIG. 5 is a bottom plan view taken along lines 5—5 of FIG. 2.
Figure 3:
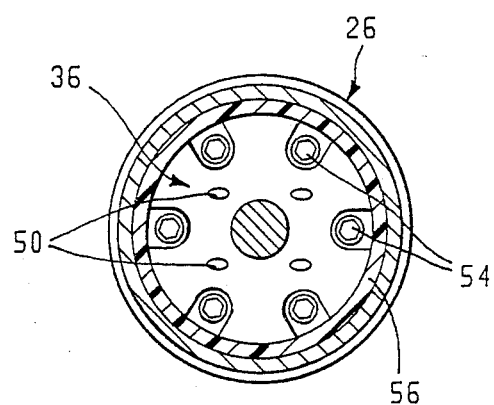
FIG. 3 is a cross-sectional view taken along lines 3—3 of FIG. 2.

With reference to FIG. 1, there is shown the friction welding apparatus of the present invention showing a driver 10 that imparts rotational movement and which may be driven by either air or an electric motor. In the preferred embodiment it is an air driver because in the friction welding operation the driver needs to spin the plastic part at somewhere between 7000 and 9000 revolutions per minute and for minimizing the time involved for the friction welding operation an air driver can achieve that amount of revolutions more quickly than a driver using an electric motor. One such suitable air driver is sold by the Rockwell International Air Tool Company located in Columbia, S.C., and is referred to as a self-feed fastener tool model BLN-3177. This type of air driver and its operation and function is well-known to those persons having ordinary skill in friction welding technology and for purposes of describing the present invention a description of the particular design and operation of the air driver is not necessary. Located below the air driver 10 is a vacuum chamber 12 and below the vacuum chamber 12 is a vacuum head member 14. Schematically shown is a vacuum pump 16 with a vacuum hose 18 connecting the vacuum pump 16 to the vacuum chamber 12 through a threaded vacuum hose connection 20. Connected to the vacuum hose 18 is a vacuum sensor 22 which senses whether or not there is vacuum pressure in the vacuum hose.

With reference to FIG. 2, the details of the friction welding apparatus of the present invention will be described. The driver 10 has at the bottom thereof a nose portion 24 which is part of the driver housing to which is secured a sleeve 26. The sleeve 26 is a metal elongated cylinder which has its upper end 28 clamped around the nose 24 of the driver as by any suitable means such as a clamp fastener 30. When the clamp is tightened it will secure the sleeve 26 to the nose 24 and should be airtight thus eliminating any leakage of air through the connection between the sleeve 26 and the nose 24 of the air driver 10. Located at the lower portion 32 of the sleeve 26 is a rotatable part driver assembly 34. In the preferred embodiment the part driver assembly 34 includes a cap member 36, a part driver member 38 and a vacuum head member 14. If desired, the cap member 36 and the part driver member 38 could be made as a single unit as the part driver assembly 34 operates and functions the same whether made as a single unit or in two parts joined together.

Figure 4:
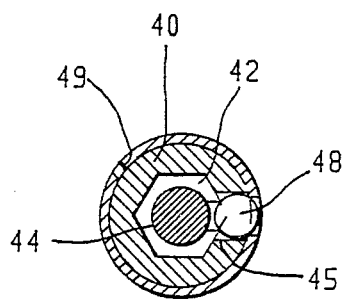
FIG. 4 is a cross-sectional view taken along lines 4—4 of FIG. 2.

The air driver 10 has a chuck 40 which is rotated about its central axis and the chuck 40 has a hex cavity 42 (FIG. 4) for receiving therein a hexagonal drive shaft 44 which will be driven in unison with the rotation of the chuck 40. To retain the hexagonal drive shaft 44 in the hex cavity 42 there is a recess 46 around the hexagonal drive shaft 44 which will engage a retainer ball 48 carried by the lower end of the chuck 40. The retainer ball 48 is resiliently retained in a groove 45 (FIG. 4) by a C-spring 49. The hexagonal drive shaft 44 is secured to the cap member 36 which has a circular body slightly smaller in diameter than the inside diameter of the sleeve 26 and there is a plurality of air ports 50 through the cap member 36 with one end of the air ports in air flow communication with the interior of the sleeve 26 and the other end of the air ports in air flow communication with a cavity 52 located on the underside of the cap member 36 as shown in FIG. 2. Located below the cap member 36 is the part driver member 38 which is again cylindrical in shape and slightly smaller in diameter than the inside diameter of sleeve 26. The part driver member 38 is secured to the cap member 36 by means of a plurality of bolts 54. It will be understood that the rotational movement of the cap member 36 will also cause the part driver member 38 to rotate in unison therewith. Located at the lower end portion 32 of sleeve 26 is a low friction cylindrical bushing 56 which acts as a bearing surface to allow the cap member 36 and the part driver member 38 to rotate within the sleeve 26, yet be supported laterally within the sleeve 26. In the preferred embodiment the low friction cylindrical bushing 56 is made of carbon graphite because it acts as a seal against loss of vacuum pressure within the vacuum chamber 12. The part driver member 38 is open ended and has positioned within it a portion of the vacuum head member 14. The vacuum head member 14 has a hollow body which in the case of the preferred embodiment is a bore 58 open at both ends so that air may flow through the vacuum head member 14.

As can be seen in FIG. 2, the bore 58 of the vacuum head member 14 passes through an elongated cylindrical portion 60 which has the upper end 61 of the bore 58 in air flow communication with the cavity 52 of the cap member 36. The lower end 63 of the bore 58 is open to atmospheric pressure. The vacuum head member 14 is rotatable independent of the part driver member 38 and as such there is a press fit ball bearing assembly 62 located at the upper end of the elongated cylindrical portion 60. The bearing assembly has ball bearing 62a, an inner race 62b and an outer race 62c which is spaced from the cap member 36 by a circular washer 59. There is also a ball bearing assembly 65 located at the lower end of the elongated cylindrical portion 60. These ball bearing assemblies are constructed so that there is no air leakage through the component parts between atmospheric pressure and below atmospheric pressure in the vacuum chamber 12. In the preferred embodiment there is also a ball bearing assembly cylindrical spacer 64 located inside the part driver 38 to maintain the upper ball bearing assembly 62 and the lower ball bearing assembly 65 in spaced relationship.

Figure 6:
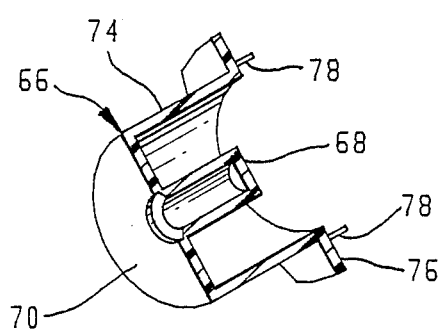
FIG. 6 is a perspective view partially in cross-section showing the configuration of a plastic part that can be utilized in the present invention.
Figure 7:
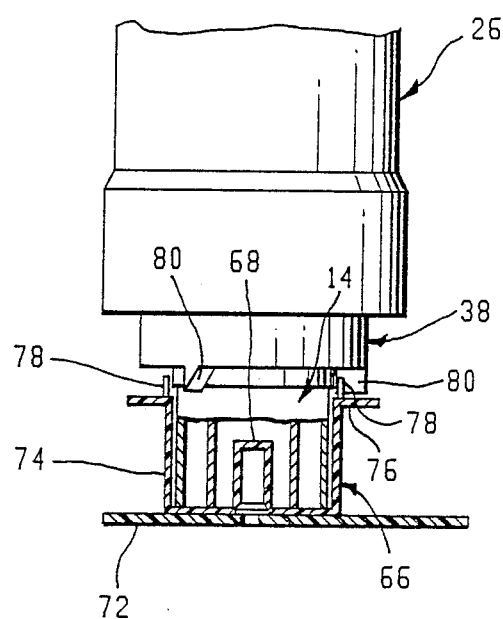
FIG. 7 is a side elevational view partially in cross-section showing the plastic part of FIG. 6 being welded to a plastic work piece by friction utilizing the apparatus of the present invention.

With reference to FIGS. 6 and 7, there is shown a fastener or plastic part 66 which in the preferred embodiment has a fastener attaching portion 68 integrally formed with a base 70 which is adapted to be fused to a work piece 72 (FIG. 7) by friction produced heat and pressure. The part 66 has a cylindrical side wall 74 integrally formed with the base 70 and terminating at the opposite end in an outwardly directed flange 76. The flange 76 has one or more upstanding protrusions or ears 78 that generally extend in the direction of portion 68 located in the center of the part 66. When the part 66 is seated on the vacuum head 14 as shown in FIG. 7, the protrusions 78 extend upwardly toward the part driver member 38. Located at the bottom of the part driver member 38 is one or more and preferably three downwardly directed part engaging elements 80. The part 66, the vacuum head member 14, and the part driver member 38 are arranged so that when the plastic part 66 is placed on the vacuum head member 14 as shown in FIG. 7 the part engaging elements 80 will during their rotation engage the protrusions 78 of the part 66 and therefore the part driver member 38 will cause the part 66 to rotate in unison therewith. With this arrangement then when the base 70 of the plastic part 66 is placed against a work piece 72 rotational drive force by the tool 10 is transmitted through chuck 40, drive shaft 44 causing the cap member 36 to rotate about its central axis and the part driver member 38 to also rotate in unison. With the part engaging elements 80 of the part driver member 38 contacting the protrusions 78 of plastic part 66 as shown in FIG. 7 to rotate the plastic part 66 and with axial pressure applied to the part 66, friction between the part 66 and work piece 72 causes heat to be generated at the base 70 of the part 66. Sufficient build up of heat causes the base 70 and the area of the work piece contacted by the base 70 to melt and the part 66 is fused to the work piece 72. When fusion takes place the protrusions 78 being rather fragile are sheared off and rotation of the plastic part 66 stops as it is no longer being driven by the part driver member 38. However, because the vacuum head member 14 may be rotated independent of the part driver member 38 as described above, axial pressure between the part 66 and the work piece 72 can be maintained to insure proper fusion between the part 66 and the work piece 72. The vacuum pressure should be maintained as the vacuum head member 14 is moved upwardly from the fused plastic part so that in the event the plastic part is not fused satisfactorily to the work piece 72 the plastic part will still be held on the vacuum head by suction and thus identify a faulty weld. In the preferred embodiment the plastic part 66, when fused to the work piece 72, is used to receive a fastener such as a screw in the central fastening portion 68 and support some load bearing structure in a refrigerator.

The above described structural arrangement of the friction welding apparatus provides for automation of the attachment by fusion of a plastic part to a work piece. This is accomplished by providing in the automated system a means to orient and feed the plastic parts to the friction welding apparatus which may be done with conventional feeder bowls that are well known in the industry. The friction welding apparatus will have presented to it a part 66 and by means of vacuum pressure supplied by the vacuum pump 16 through vacuum hose 18, vacuum chamber 12, air ports 50 in cap member 36 and the bore 58 in the vacuum head member 14, the part 66 will be sucked onto the vacuum head member 14 and hold it on the head 14 by means of the vacuum pressure during the friction welding operation described above. In an automated system it is desirable to be able to determine whether or not a part 66 is actually in place on the vacuum head member 14 prior to commencing the friction welding operation. For this purpose there is provided a conventional vacuum sensor 22 which will indicate whether or not there is vacuum pressure in the vacuum hose 18 and therefore determine the presence or absence of a part 66 on the vacuum head member 14 prior to the friction welding operation. Once it has been determined that a part 66 is present on the vacuum head member 14 then the friction welding process may proceed to attach the part 66 to the work piece 72 as described above. Automation of such a procedure is within the ordinary skill of persons that use vacuum sensors to control automatically operated apparatus.

The use of vacuum pressure to retain the part 66 on the vacuum head member 14 during a friction welding operation offers some advantages over a "press fit" driver assembly system heretofore used in the industry other than just the inherent advantages in an automated operation of lower labor costs and increased efficiency. When a "press fit" system is utilized, it is necessary that the parts 66 and the vacuum head member 14 have a very tight tolerance to insure a proper fit between the part and the driver assembly so that they do not fall off prior to the friction welding operation. WIth the use of vacuum pressure to retain the part 66 on the vacuum head member 14 the tolerance requirements are much less and this is particularly important where there are many drivers 10 being used, usually simultaneously, to fuse a multiplicity of such parts to a single work piece. Because there are inherent variations in such an arrangement the "press fit" driver assembly design is unsuitable. Moreover, the cost of the labor involved is reduced as it is no longer required to have an operator manually place the parts one by one on the vacuum head member 14.

While, in accordance with the Patent Statutes, there has been described what at present is considered to be the preferred embodiment of the invention, it will be obvious to those skilled in the art that various changes and modifications may be made thereto without departing from the invention. It is, therefore, intended by the appended claims to cover all such changes and modifications as fall within the true spirit and scope of the invention.

What is claimed is:

1. Apparatus for holding and spinning a plastic part during a friction welding operation to join the plastic part to a plastic work piece comprising:
   a driver to impart rotational movement;
   a vacuum chamber; and
   a rotatable part driver assembly connected to the driver for rotational movement and having air ports in air flow communication with the vacuum chamber and having means to rotate the plastic part in unison therewith, said part driver assembly including a vacuum head member with a hollow body rotatable independent of the part driver assembly, one end of the vacuum head member adapted to receive a plastic part for friction welding to a plastic work piece and the other end in air flow communication with the air ports in the part driver assembly to hold the plastic part on the vacuum head member by vacuum pressure during the friction welding operation.

2. The apparatus of claim 1 wherein the vacuum chamber is a cylindrical sleeve located between the driver and the rotatable part driver assembly.

3. The apparatus of claim 2 wherein the rotatable part driver assembly is received at one end of the vacuum chamber cylindrical sleeve and there is a bearing surface between the part driver assembly and the cylindrical sleeve.

4. The apparatus of claim 3 wherein the bearing surface is made of carbon graphite.

5. The apparatus of claim 1 wherein the vacuum head member hollow body is an elongated cylindrical hollow body which is separated from the rotatable part driver assembly by a bearing surface.

6. The apparatus of claim 5 wherein the bearing surface comprises two press fit ball bearing assemblies with a bearing assembly located at each end of the hollow body.

7. The apparatus of claim 1 wherein the rotatable part driver assembly comprises a cap member connected to the driver for rotational movement, said cap member having air ports in air flow communication with the vacuum chamber, a part driver member secured to the cap member for rotation in unison therewith, said part driver member having means to rotate the plastic part in unison therewith, and the vacuum head member.

8. The apparatus of claim 1 including a vacuum pump located outside the vacuum chamber with a vacuum hose interconnecting the pump and the chamber.

9. The apparatus of claim 8 wherein a vacuum sensor is in air flow communication with the vacuum hose and detects the presence or absence of vacuum pressure in the vacuum hose and thereby detects the presence or absence of a plastic part on the vacuum head member.

* * * * *